United States Patent [19]

Kells et al.

[11] Patent Number: 5,768,504
[45] Date of Patent: Jun. 16, 1998

[54] METHOD AND APPARATUS FOR A SYSTEM WIDE LOGAN IN A DISTRIBUTED COMPUTING ENVIRONMENT

[75] Inventors: Timothy Roger Kells, Round Rock; Wayne Dube Sigler, Austin, both of Tex.

[73] Assignee: International Business Machines Corporation, Armonk, N.Y.

[21] Appl. No.: 893,127

[22] Filed: Jul. 15, 1997

Related U.S. Application Data

[63] Continuation of Ser. No. 497,300, Jun. 30, 1995, abandoned.

[51] Int. Cl.⁶ ............ G06F 13/00; G11B 23/28; H04K 1/00
[52] U.S. Cl. ............... 395/187.01; 395/188.01; 380/3; 380/25
[58] Field of Search ............. 395/186, 187.01, 395/188.01; 380/3, 4, 25

[56] References Cited

U.S. PATENT DOCUMENTS

| | | | |
|---|---|---|---|
| 5,001,628 | 3/1991 | Johnson et al. | 364/200 |
| 5,032,979 | 7/1991 | Hecht et al. | 364/200 |
| 5,220,603 | 6/1993 | Parker | 380/21 |
| 5,235,642 | 8/1993 | Wobber et al. | 380/25 |
| 5,241,594 | 8/1993 | Kung | 380/4 |
| 5,263,157 | 11/1993 | Janis | 395/600 |
| 5,263,158 | 11/1993 | Janis | 395/600 |
| 5,265,221 | 11/1993 | Miller | 395/725 |
| 5,266,172 | 11/1993 | Seymour et al. | 395/800 |
| 5,287,461 | 2/1994 | Moore | 395/275 |
| 5,315,657 | 5/1994 | Abadi et al. | 380/25 |
| 5,335,346 | 8/1994 | Fabbio | 395/600 |
| 5,339,403 | 8/1994 | Parker | 380/21 |
| 5,367,688 | 11/1994 | Croll | 395/700 |
| 5,475,838 | 12/1995 | Fehskens et al. | 395/185.1 |

FOREIGN PATENT DOCUMENTS

0573248A1  12/1993  European Pat. Off. .

OTHER PUBLICATIONS

IBM Technical Disclosure Bulletin, vol. 32, No. 8a, Jan. 1990, New York US, Logon Assist For Multiple Logons.

IBM Technical Disclosure Bulletin, vol. 38, No. 5, May 1995, Secure Generic Authentication for Distributed Computing Environment Applications.

Data Communications, vol. 24, No. 1, Jan. 1, 1995, pp. 122, 124 XP000480828 Johnson J T: "Sign on and Be Safe IBM's Network Security Program (NETSP)".

Technical Disclosure Bulletin, vol. 32 No. 8A Jan. 1990, Logon Assist For Multiple Logons.

Primary Examiner—Robert W. Beausoliel, Jr.
Assistant Examiner—Norman M. Wright
Attorney, Agent, or Firm—David A. Mims, Jr.

[57] ABSTRACT

A system wide sign-on capability in a distributed computing environment (DCE) is provided. Acquired distributed computing environment credentials are usable by any process/window on a desktop. DCE logon application programming interfaces create and recognize the presence of a credentials cache capable of being used by DCE processes in the system. System wide logon occurs whenever the logon API is invoked with the environment variable set. This API is called as a result of the system logon option having been selected. The API updates a global variable with the name of the credentials cache. A process variable is set to the global value by initialization logic for all subsequently invoked applications. As a result, any calls made by these application will acquire the credentials identified by the variable.

11 Claims, 7 Drawing Sheets

SYSTEM LOGON PROCESS
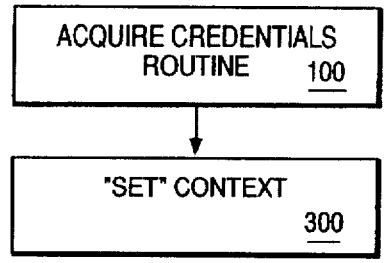
FIG. 2A
APPLICATION/CREDENTIALS ASSOCIATION
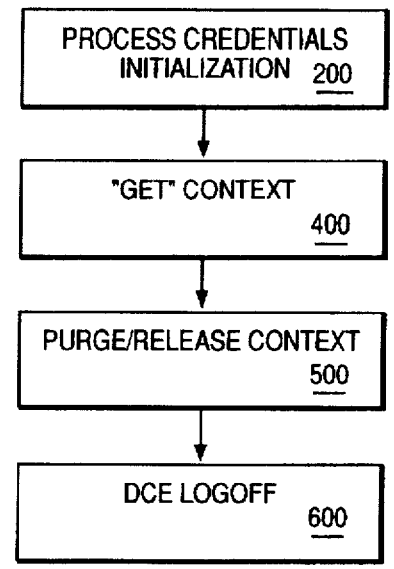
FIG. 2B
FIG. 3
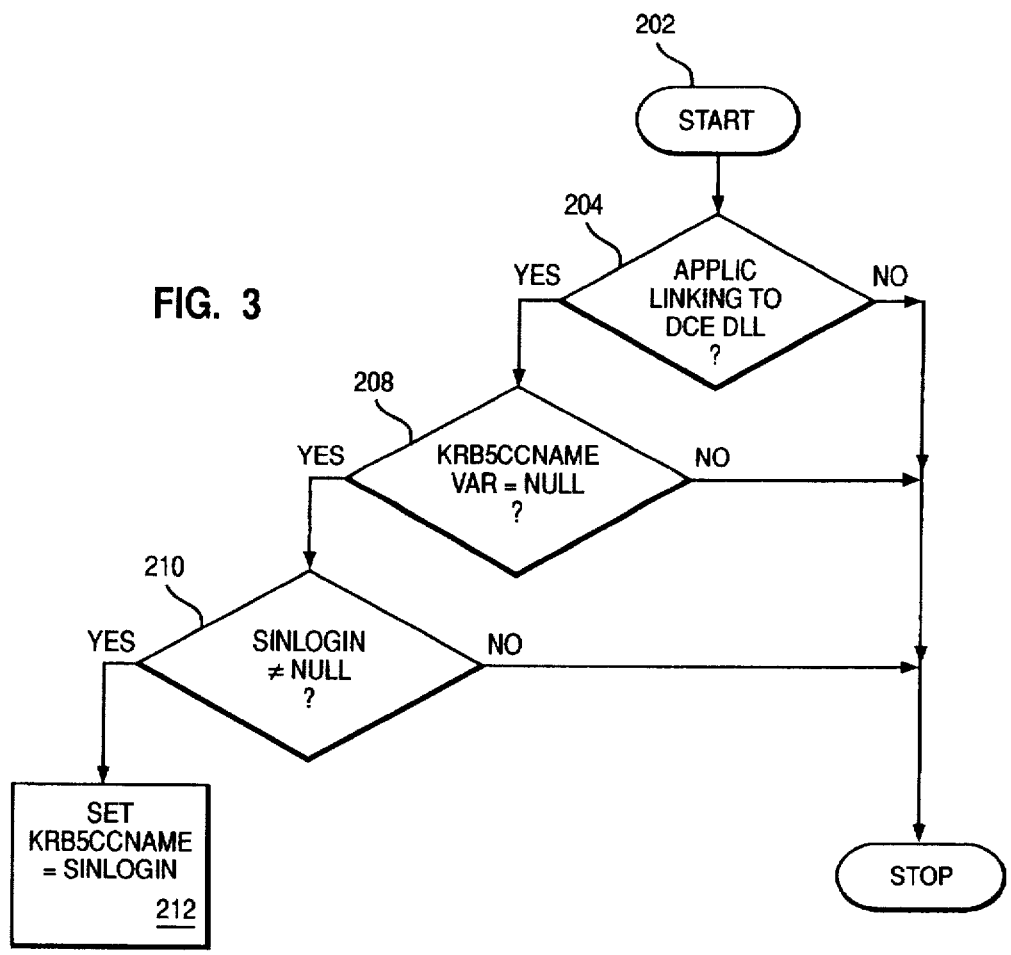

METHOD AND APPARATUS FOR A SYSTEM WIDE LOGAN IN A DISTRIBUTED COMPUTING ENVIRONMENT

This is a continuation of application Ser. No. 08/497,300 filed Jun. 30, 1995 now abandoned.

FIELD OF THE INVENTION

The present invention relates to data processing systems, and more particularly, to the propagation of a user's identity throughout a distributed computing environment.

BACKGROUND OF THE INVENTION

Computer users are demanding flexible and sophisticated techniques in hardware and software implementations. This flexibility and sophistication is readily evident in evolving systems which alleviate requiring users to logon multiple times to access nodes (systems) in a network. The concept of a "single sign-on" provides the ability to logon securely to several systems at once using a single access code. Prior to these developments, users who accessed multiple applications or systems during the course of a day encountered many frustrations. The use of a word processing program required a user have a password to access the application. A second password was used to logon and access electronic mail. And the list goes on. A recent study revealed that the average user of four applications spends about 44.4 hours per year just logging on to those applications. If the same user had a single sign-on capability, the time required to log on to the four applications is reduced to about 17 hours per year.

A single sign-on capability has been implemented by the IBM Corporation in a version of the Operating System/2 product. This function is accomplished by keeping a single copy of five master system files which are shared by every node. A network administrator arranges the file tree of each user so that the same directories and files are seen regardless of which node the user is logged on to. The file tree provides the capability of logging on from any machine and providing an identical interface from any node, and in effect provides a single system image of the environment from any of the nodes. In summary, the single system image is implemented by keeping only one master copy of the above system files at a master node. Each node has a file of instructions executed at system initial program load (IPL). The master files are loaded over the node's own local copies of these files at IPL. The major deficiency of this method is the requirement for the user to logon to the node before the system wide capabilities can be realized.

A second method for eliminating the need for multiple logon has been proposed for the Operating System/2 EE Database Manager product. (OS/2 is a trademark of the IBM Corporation). In the current implementation of the Operating System/2 EE Database Manager product, a logon menu is presented to a user attempting to access a protected object. The function providing the menu is called by the requesting subsystem when it is determined that there has been no valid logon. The proposed implementation provides a remote authorization table (RAT) to alleviate the multiple logon problem. On the user's initial logon (either to the local system or to a remote node), a table is built containing an entry of the user's identity (userid), a password, and identity of the node (e.g., local or remote node name) to which the user is logging on. If the resource to be accessed is on a remote server, the database manager is called by the subsystem to obtain the userid/password for the target node. If no userid/password is in the target node, the most recently used remote for another node is returned. If no logon has occurred, then the local userid/password is passed to the subsystem requestor for use on that system. If the information returned is other than that of the node, a RAT entry is built, composed of the node name and the userid and a password is returned. If the password fails, the subsystem will call user management services to bring up a logon menu to allow the user to provide the correct password for the remote server node. This node is then saved in the RAT for future use replacing the incorrect RAT entry previously built for the node. Like the earlier method, this method too requires a user logon before the system wide capabilities are available to the user.

It is desirable to have a system wide logon capability accessible to a user without requiring the user logon to a system.

SUMMARY OF THE INVENTION

This invention relates to a method and apparatus for providing a single sign-on code in a distributed computing environment. The invention renders the distributed computing environment (DCE) portion of a single user logon into a system wide logon credential. The acquired distributed computing environment credential is usable by any process/window on a desktop. DCE logon APIs (Application Programming Interfaces) create and recognize the presence of a credentials cache capable of being used by DCE processes in the system. DCE applications invoked after a user log-off do not inherit credentials established by the previous system logon. Applications started by the user when logged on will continue to use logged off user's credentials. System wide logon occurs whenever the $SEC_{13}LOGIN_{13}SET_{13}CONTEXT$ API is invoked with the environment variable SINGLELOGIN set. This will be the case when the API is called by the Lan Server (LS) integrated logon program in the DCE2.0 environment. This API is called by DCELOGON as a result of the system logon option having been selected. The API will update a Global with the name of the credentials cache. The variable, KRB5CCNAME, will be set to the global value by SEC.DLL initialization logic for all subsequently invoked applications using DCE security if it is not set in the environment already (e.g., a per-process DCELOGON will override the default context). As a result, any $SEC_{13}LOGON$ calls made by these application will acquire the credentials from the variable.

BRIEF DESCRIPTION OF THE DRAWINGS

FIGS. 2A and 2B are block diagrams of the functional blocks required for implementation of a system wide logon capability.

FIG. 3 is a flow diagram of the security initialization routine.

DETAILED DESCRIPTION OF THE EMBODIMENTS

This invention provides a method and apparatus for propagating a distributed computing environment identification throughout the entire OS/2 process tree even if the identification is not logged in at the root process. As used in this application and known to those skilled in the art, a distributed computing environment (DCE) frees users from being tied to any particular node in a network. DCE is a set of communications protocols defined by the Open Software Foundation. DCE allows a user to access a "home" directory from any machine in the DCE. In addition, DCE allows unlike hardware platforms and operating systems to communicate and share resources.

Figure 1:
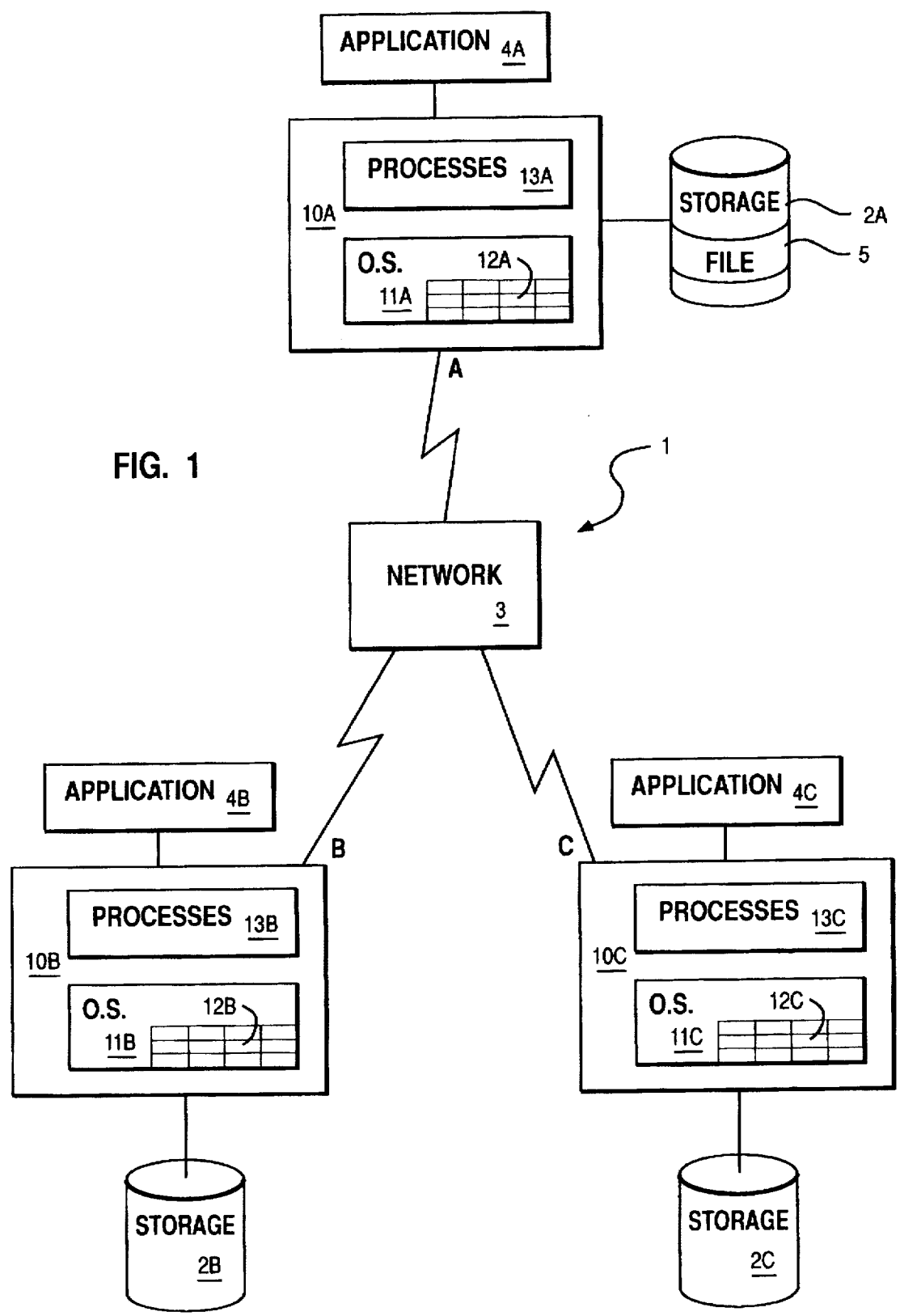
FIG. 1 is a block diagram representation of a computer network where the invention may be practiced.

Turning now to FIG. 1, there is shown a distributed data processing system/DCE in a communication network. In this environment, each processor at a node in the network potentially may access all the files in the network no matter at which nodes the files may reside. As shown in FIG. 1, a distributed network environment 1 may consist of two or more nodes A, B and C connected through a communication link or network 3. The network 3 can be a local area network (LAN) or a wide area network (WAN), the latter comprising a switched or leased teleprocessing (TP) connection to other nodes or to a SNA (System Network Architecture) network of systems. At any of the nodes A, B or C there may be a processing system 10A, 10B or 10C, such as an IBM PS/2 Personal Computer or IBM RISC System/6000 workstation. Each of these systems 10A, 10B and 10C may be a single user system or a multi-user system with the ability to use the network 3 to access files located at a remote node in the network.

With reference to FIGS. 2A and 2B, block diagrams of the major components of the system wide logon procedure are shown. FIG. 2A illustrates the system logon process where the credentials routine is acquired as shown in block 100. This block represents a series of public API calls which are responsible for authenticating the logging-in user, and building a disk-resident file containing that user's credentials. At block 300, the "set context" block 300 represented a call to the single public API responsible for establishing the previously acquired credentials as those which will be subsequently associated with newly started application processes. The application/credentials association portion of the system wide logon procedure is shown in FIG. 2B. At block 200, initialization of the credentials process is shown. The "GET" context block 400 establishes the context for single system wide Logon capability. The purge/release context block 500 purges/destroys memory contents allocated for logon parameters. The DCE logoff block 600 is entered from the purge/release block 500 and terminates the DCE logon procedure.

Figure 2C:
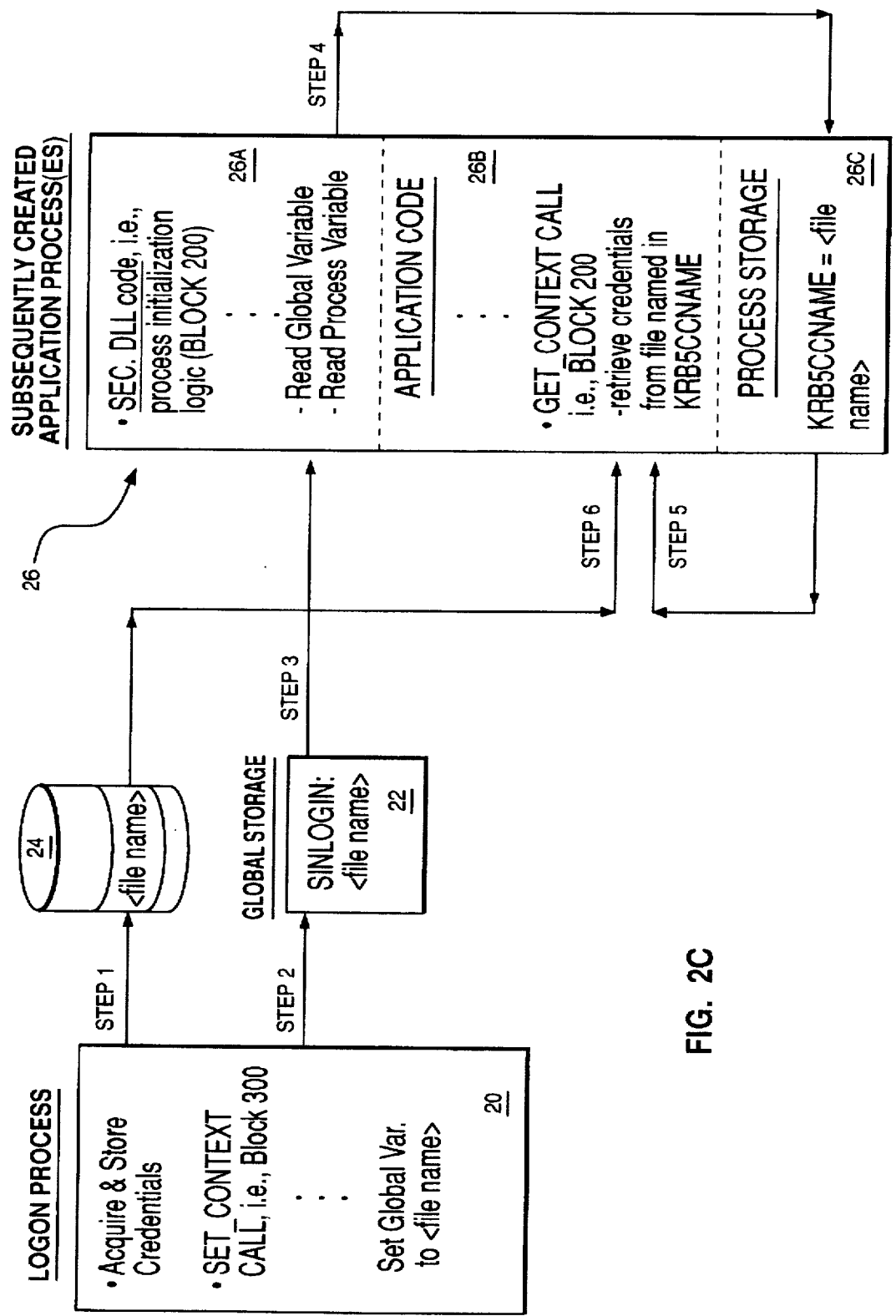
FIG. 2C is a block diagram of the major components of the system wide logon invention.

Turning now to FIG. 2C, the invention is further illuminated by the overview shown therein. The logon process is described in block 20 which consists of acquiring and storing the credentials. In addition, the "SET" context procedure of block 300 (FIG. 2A) is executed which culminates with setting the Global variable to <File Name>. The actual file containing the credentials is stored in a user's local storage 24. The <File Name> variable is then stored in Global Storage 22 under the variable SINLOGIN. Subsequently created application processes obtain the system wide credentials as described in block 26. The security dynamic link library (DLL) code 26A contains the process initialization logic which is described in Block 200 (FIG. 2B). This code reads the Global Variable and sets the process variable.

The <File Name> variable is stored in process storage as the variable KRB5CCNAME 26C. Application code 26B contains the "Get" context call, described in Block 400 (FIG. 2B), which retrieves the credentials from the file named in KRB5CCNAME.

Turning to FIG. 3, the flow diagram for the security initialization routine is shown. The procedure starts at block 202 and proceeds to block 204 where a check is done to see if an application is linking to the DCE. If YES, at block 208, the procedure determines if the KRB5CCNAME variable is NULL. If the variable is NULL, at block 210 the procedure checks if SINLOGIN is not NULL. At block 212, the procedure sets the KRB5CCNAME variable to equal SINLOGIN.

Figure 4:
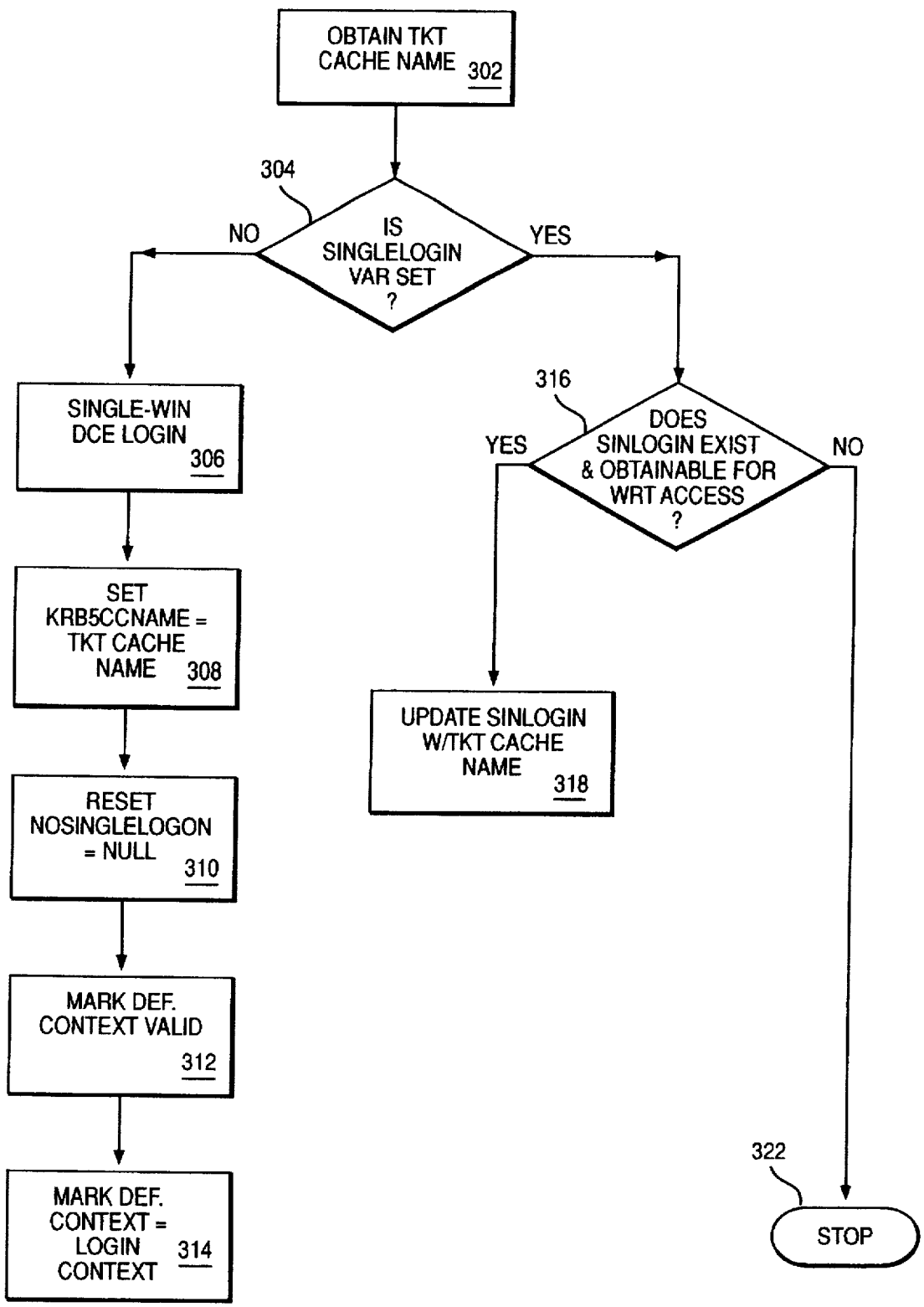
FIG. 4 is a flow diagram of the "Set Context" function for the system wide logon invention.

Turning now to FIG. 4, a flow diagram for the set context for the system wide logon is illustrated. The method starts at block 302 where the procedure obtains the ticket name from the input parameter "login context". At block 304, the procedure determines if the SINGLELOGIN environment variable is set. One skilled in the art will appreciate that this is the system logon option. If NO, at block 306 the traditional single-window DCE logon is initiated. At block 308, the procedure sets KRB5CCNAME variable equal to the ticket cache name. At block 310, the procedure resets the NOSINGLELOGONCACHE variable to NULL and marks the default context value for the process at block 312. At block 314, the procedure marks the default context equal to the login context supplied on the call. One skilled in the art will appreciate that this sets the default context (system wide) for all other processes to use. Returning to block 304, if the SINGLELOGIN environment variable is set, a check is done at block 316 to determine if the SINLOGIN segment exist. If YES, at block 318 the procedure updates the SINLOGIN with the ticket cache name. Returning to block 316, if the SINLOGIN segment does not exist, or if the SINLOGIN segment can not be obtained for write access, then at block 322 the procedure stops.

Figure 5:
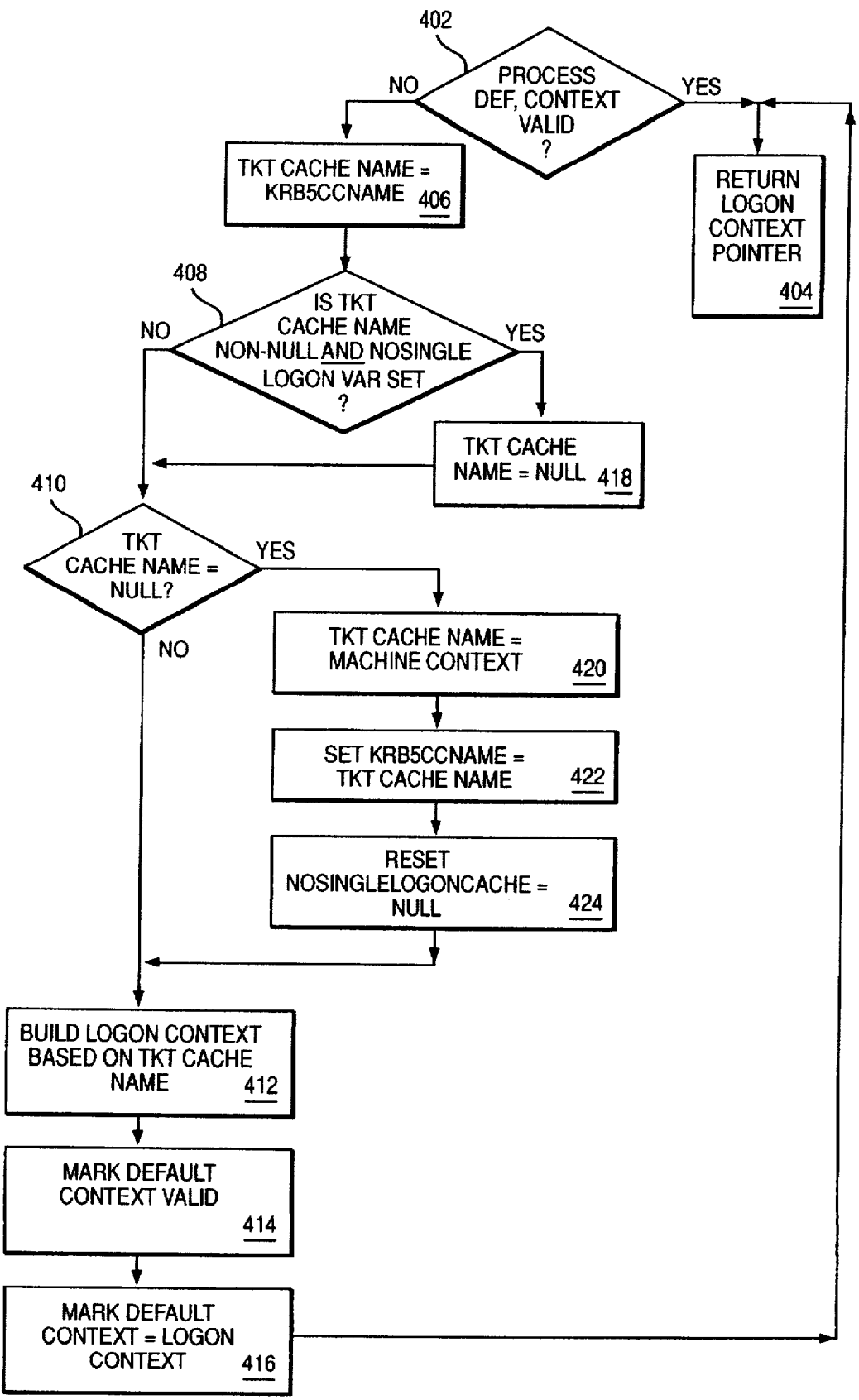
FIG. 5 is a flow diagram of the "Get Context" function for the system wide logon invention.

Turning to FIG. 5, the flow diagram for the "get context" function is shown. The procedure starts at block 402 where a check is conducted to determine if the default context is marked valid. If YES, at block 404 the procedure returns the logon context pointer stored in the default context. One skilled in the art will appreciate that this is the condition where a previous "get context" call has already created and marked the default context valid. Since a default context (system wide logon) is available, it is used as the logon context. Returning to block 402, if the process default context is not valid, at block 406 the procedure sets the "ticket cache" name equal to the value of the variable KRB5CCNAME. At block 408, a check is conducted to determine if the ticket cache name is not NULL and the NOSINGLELOGON variable is set. If YES, at block 418 the ticket cache name is set to null. One skilled in the art will appreciate that this indicates the process desire to be associated with the machine context. If NO, at block 410 the procedure checks if the ticket cache name is null. If the ticket cache name is NULL, at block 420 the procedure sets the ticket cache name equal to the machine context ticket cache. At block 422, the procedure sets the KRB5CCNAME variable equal to the machine context ticket cache name and resets the NOSINGLELOGONCACHE variable equal NULL at block 424. Returning to block 410, if the ticket cache name is not null, at block 412 the procedures builds the logon context as a function of the ticket cache name. The default context is marked valid at block 414 and the mark default context is set equal to the logon context at block 416. It will be appreciated that the context is built (block 414)

using the machine context when the ticket cache name is equal to the machine context.

Figure 6:
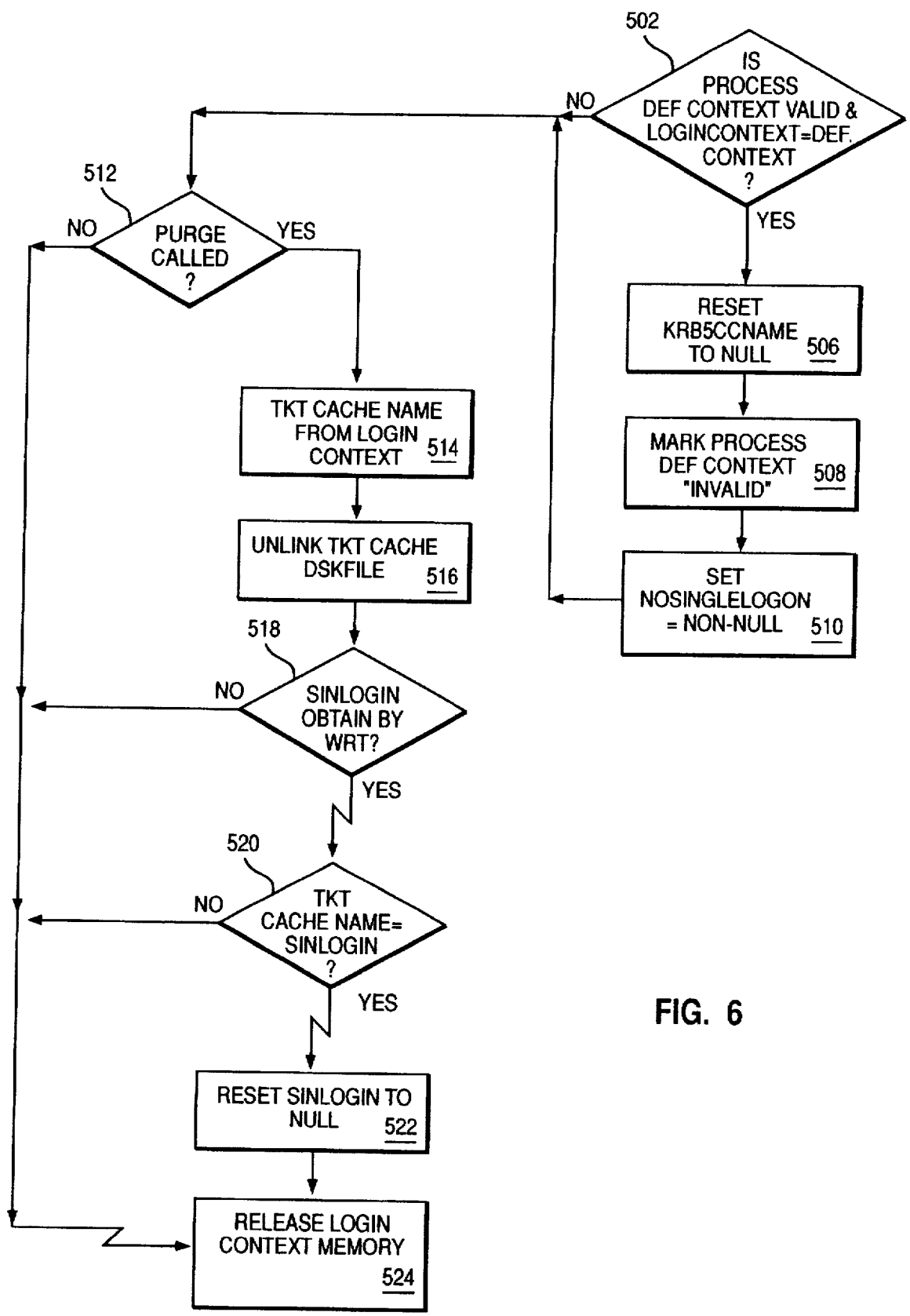
FIG. 6 is a flow diagram of the purge/release context for the system wide logon invention.

Turning now to FIG. 6, a flow diagram of the purge/release context function is shown. At block 502, the procedure determines if the process default context is marked valid and the logon context is equal the default context. If YES, at block 506 the variable KRB5CCNAME is set to NULL and the process default context is marked invalid at block 508. At block 510, the NOSINGLELOGONCACHE variable is set to a non-NULL value and processing continues at block 512. Returning to block 502, if the process default context is not valid, at block 512 the procedure checks to determine if the purge function has been called. If YES, at block 514, the procedure obtains the ticket cache name from the input "logon context" and unlinks (destroys) the credential file at block 516. One skilled in the art will appreciate that "releasing memory" in block 524 of this procedure does not destroy the credential file contents, however, a purge function does clobber/destroy the credential file contents. A check is carried out at block 518 to determine if SINLOGIN was obtained by the write. If YES, at block 520 a check is conducted to see if the ticket cache name is equal to the value stored in the SINLOGIN. If YES, at block 522, the SINLOGIN segment is reset to NULL and the login context memory is released at block 524. This is done to keep the desktop from executing with a clobbered cache.

Figure 7:
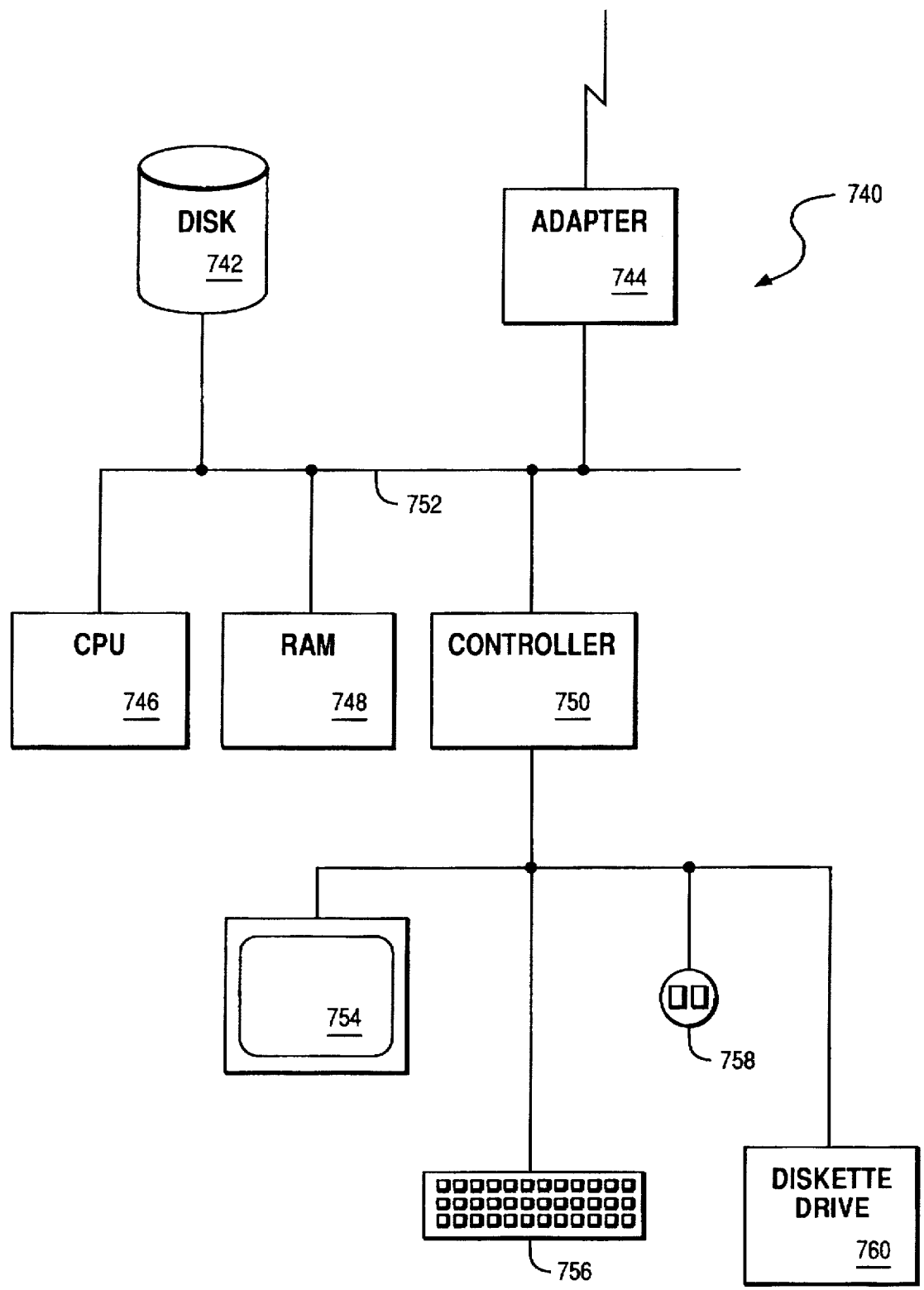
FIG. 7 is a block diagram of a computer system capable of implementing the preferred embodiment of the present invention.

Turning to FIG. 7, a generalized computer system/workstation 740 is shown as embodied in a number of commercially available systems such as the IBM PS/2 computer. (PS/2 is a trademark of the IBM Corporation). The current operating system support for the present invention is an Intel MicroProcessor with Operating System/2. 2.3. With reference to FIG. 6, the basic components include one or more processing units or CPUs 746, hard disk or other permanent storage 742, random access memory 748, network communications support via an adapter 744, and input/output support to display device 754, keyboard 756, pointing device 758 and floppy diskette drive 760 through I/O controller 750. One skilled in the art will appreciate that a computer program product containing computer program logic recorded thereon may be stored on a computer readable medium (e.g., floppy diskette) and inputted to the computer system using the floppy diskette drive 760. These components communicate over a system bus 752.

While the invention has been described with respect to a preferred embodiment thereof, it will be understood by those skilled in the art that various changes in detail may be made therein without departing form the spirit, scope, and teaching of the invention. Accordingly, the herein disclosed invention is to be limited only as specified in the following claims.

What we claim is:

1. A method for locating a user's credentials for using a local computer system in a distributed computing environment, comprising the steps of:

providing an operating system within said local computer system having a plurality of applications;

starting a selected one of said applications by said user at said local computer system;

determining in said selected application whether a pointer to the user's credentials exists at the local computer system before logging onto said distributed computing environment, if so, using the user's credentials;

if not, determining in said selected application whether a default set of credentials exists at the local computer system, if so, using the default set of user credentials; and if not, using a set of credentials for the local computer system in said selected application.

2. The method of claim 1, further comprising the steps of:

determining whether a process in said selected application associated with said operating system on said local computer system logged onto said distributed computing environment can use the default set of user credentials; and if not, using the set of credentials for the local computer system.

3. An apparatus for locating a user's credentials for use in a local computer system in a distributed computing environment, comprising:

providing an operating system in said local computer system having a plurality of applications;

starting a selected one of said applications by said user at said local computer system;

means for determining in said selected application whether a pointer to the user's credentials exists at the local computer system before logging onto said distributed computing environment, if so, using the user's credentials;

if not, means for determining in said selected application whether a default set of credentials exists at the local computer system, if so, using the default set of user credentials; and if not, means for using a set of credentials for the local computer system.

4. The apparatus of claim 3, further comprising:

means for determining whether a process can use the default set of user credentials; and if not, means for using the set of credentials for the local computer system.

5. A computer program product having a computer readable medium having computer program logic recorded thereon for locating a user's credentials using a local computer system in a distributed computing environment, comprising:

computer readable program code means for providing an operating system in said local computer system having a plurality of applications;

computer readable program code means for starting a selected one of said applications by said user at said local computer system;

computer readable program code means for determining in said selected application whether a pointer to the user's credentials exists at the local computer system before logging onto said distributed computing environment, if so, computer readable program code means for using the user's credentials;

if not, computer readable program code means for determining in said selected application whether a default set of credentials exists at the local computer system, if so, computer readable program code means for using the default set of user credentials; and if not, computer readable program code means for using a set of credentials for the local computer system.

6. The computer readable program of claim 5 comprising:

computer readable program means for determining whether a process associated with said operating system on said local computer system logged onto said distributed computing environment can use the default set of user credentials; and if not, computer readable program code means for using the set of credentials for the local computer system.

7. A method of providing system wide logon capability to a user at a workstation in a network in a distributed computing environment, comprising:

providing an operating system in said local computer system having a plurality of applications;

starting a selected one of said applications by said user at said local computer system;

acquiring and storing a user's credential in a local storage area for the workstation in said network;

establishing a logon environment for said system wide logon capability;

detecting said selected application calling for said system wide logon capability and accessing said user's credentials for the workstation and automatically logging said user onto said network.

8. The method of claim 7 wherein the step of establishing a logon environment includes the step of setting global storage to said user's credentials in said local storage area in the workstation.

9. The method of claim 8 including the step of storing the global storage setting in an application process storage area in the workstation.

10. The method of claim 9 wherein the step of accessing said user's credentials includes the step of retrieving said user's credentials from said application process area in the workstation, if present.

11. The method of claim 9 wherein the step of accessing said user's credentials includes the step of retrieving said user's credentials from said local storage area in the workstation when said user's credentials are not in said process storage area in the workstation.

* * * * *